(12) United States Patent
Li et al.

(10) Patent No.: US 10,590,290 B2
(45) Date of Patent: Mar. 17, 2020

(54) MULTI-STAGE POLYMER AS GRINDING ADDITIVE AND METHOD OF PRODUCING THE SAME

(71) Applicants: Dow Global Technologies LLC, Midland, MI (US); Rohm and Haas Company, Collegeville, PA (US)

(72) Inventors: Hu Li, Shanghai (CN); Weijun Yang, Shanghai (CN); Tao Wang, Shanghai (CN); Xinhui Huang, Shanghai (CN); Siyuan Jiang, Shanghai (CN); Cheng Hui Chen, Guangzhou (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/776,808

(22) PCT Filed: Dec. 15, 2015

(86) PCT No.: PCT/CN2015/097360
§ 371 (c)(1),
(2) Date: May 17, 2018

(87) PCT Pub. No.: WO2017/100993
PCT Pub. Date: Jun. 22, 2017

(65) Prior Publication Data
US 2018/0371267 A1    Dec. 27, 2018

(51) Int. Cl.
| | | |
|---|---|---|
| *C09D 7/41* | (2018.01) | |
| *C09D 7/65* | (2018.01) | |
| *C09D 5/02* | (2006.01) | |
| *C08F 265/04* | (2006.01) | |
| *C09D 151/00* | (2006.01) | |
| *C08F 220/18* | (2006.01) | |
| *C09D 7/61* | (2018.01) | |
| *C09D 7/43* | (2018.01) | |
| *C09D 133/06* | (2006.01) | |

(52) U.S. Cl.
CPC .............. *C09D 7/65* (2018.01); *C08F 220/18* (2013.01); *C08F 265/04* (2013.01); *C09D 5/024* (2013.01); *C09D 7/41* (2018.01); *C09D 7/43* (2018.01); *C09D 7/61* (2018.01); *C09D 133/06* (2013.01); *C09D 151/003* (2013.01)

(58) Field of Classification Search
CPC .... C08F 265/04; C08F 220/06; C08F 230/02; C08F 2220/1808; C08F 2220/1858; C08F 2220/085; C09D 7/43; C09D 15/003; C09D 5/024; C09D 133/06; C09D 7/65; C09D 7/61; C09D 7/41
See application file for complete search history.

(56) References Cited

U.S. PATENT DOCUMENTS

| | | | |
|---|---|---|---|
| 815,871 | A | 3/1906 | Smith |
| 5,266,646 | A | 11/1993 | Eisenhart et al. |
| 5,360,827 | A | 11/1994 | Toda et al. |
| 8,883,880 | B2 | 11/2014 | Luckenbach et al. |
| 9,546,267 | B2 | 1/2017 | Li |
| 2010/0029843 | A1 | 2/2010 | Milligan |
| 2010/0063171 | A1 | 3/2010 | Roschmann et al. |
| 2013/0066005 | A1 | 3/2013 | Luckenbach et al. |
| 2015/0203676 | A1* | 7/2015 | Li .................... C08F 265/06 524/522 |

FOREIGN PATENT DOCUMENTS

| | | |
|---|---|---|
| AU | 2014200431 A1 | 8/2014 |
| CN | 101952360 B | 3/2014 |
| EP | 0022633 A2 | 1/1981 |
| EP | 0404184 A2 | 12/1990 |
| EP | 0915108 A1 | 5/1999 |
| EP | 0959176 A1 | 11/1999 |
| EP | 1302515 A2 | 4/2003 |
| JP | 2011190342 A | 9/2011 |
| JP | 2014032056 | 2/2014 |
| WO | 0068304 A1 | 11/2000 |
| WO | 2007/112503 A1 | 10/2007 |
| WO | 2014200431 A1 | 12/2014 |

OTHER PUBLICATIONS

International Search Report; International Application No. PCT/CN2015/097360; International Filing Date Dec. 15, 2015; dated Sep. 22, 2016; 3 pages.
Written Opinion of the International Searching Authority; International Application No. PCT/CN2015/097360; International Filing Date Dec. 15, 2015; dated Sep. 22, 2016; 4 pages.

\* cited by examiner

*Primary Examiner* — Nathan M Nutter
(74) *Attorney, Agent, or Firm* — Karl E. Stauss; Cantor Colburn LLP

(57) ABSTRACT

This invention generally relates to a multi-stage polymer suitable for a grinding additive, a method for producing the multi-stage polymer, a composition and a paint composition comprising the multi-stage polymer and a use of the multi-stage polymer for a grinding additive of a paint composition.

10 Claims, 1 Drawing Sheet

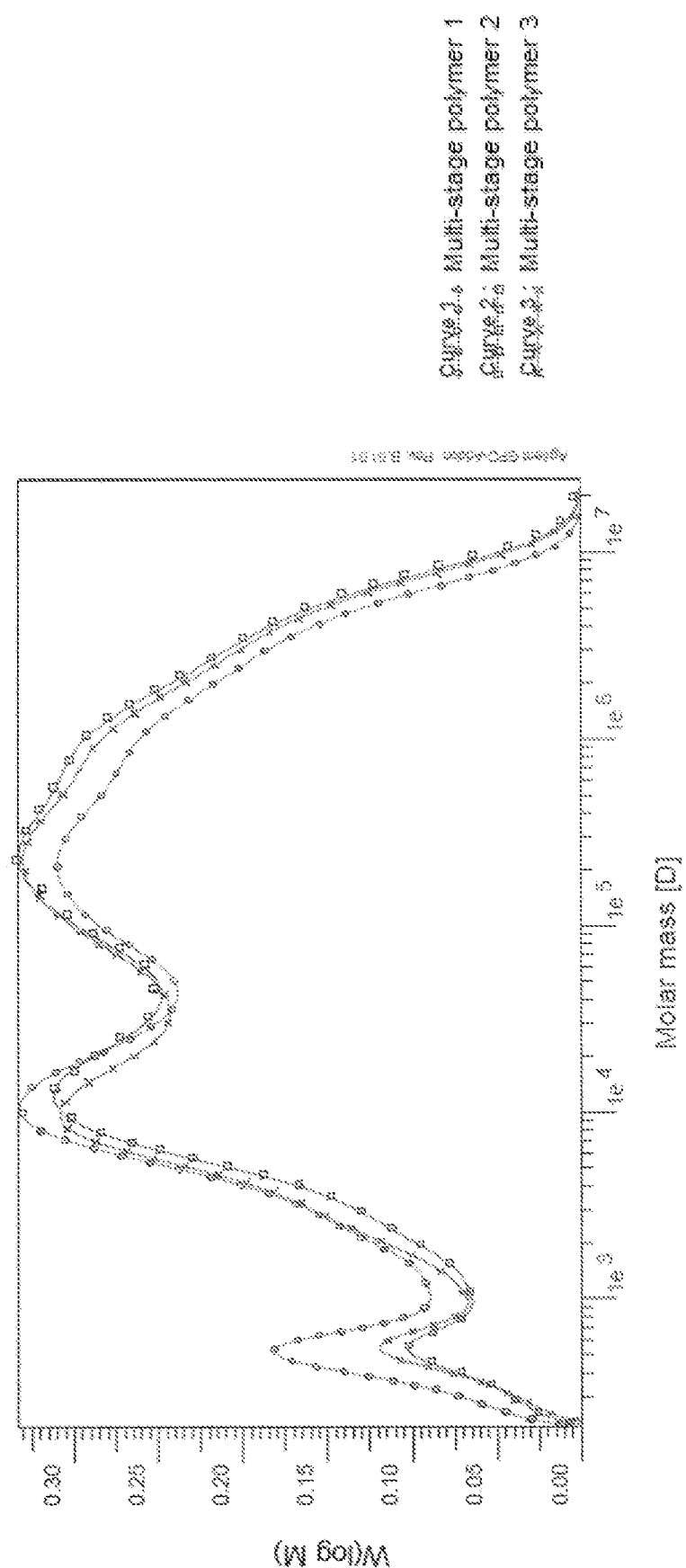

MULTI-STAGE POLYMER AS GRINDING ADDITIVE AND METHOD OF PRODUCING THE SAME

BRIEF DESCRIPTION OF THE DRAWINGS

The FIGURE is weight average molecular curves of Grinding Additives obtained by Examples 1 to 3 measured by Gel Permeation Chromatography

FIELD

The present invention generally relates to a multi-stage polymer suitable for a grinding additive, a method for producing the multi-stage polymer, a composition and a paint composition comprising the multi-stage polymer and a use of the multi-stage polymer for a grinding additive of a paint composition.

BACKGROUND

In a typical paint-making process, a dispersant is added in the grinding stage to help pigments and extenders to stably disperse. Polyacid homopolymers or copolymers are commonly used as dispersants. In the same grinding stage, thickeners are added to provide high enough viscosity to grind pigment/extender to fine sizes, as well as to deliver the proper viscosity for the final paint. Thickeners used in grinding stage, typically, are Hydroxyethyl Cellulose (HEC). In the letdown stage, more thickeners are added to reach the target viscosity for the final paint. In economy paint space, HEC and polyacid dispersant are added in the grinding stage to deliver dispersion and viscosity, and minimal thickeners could be added in the letdown stage to reach the target viscosity.

In the effort of replacing HEC for cost saving and better flow/leveling, Hydrophobically-modified Alkali Soluble Emulsion (HASE) was added in the letdown stage to reach the target viscosity. However, this approach will make the paint film more hydrophilic and lead to significant loss on scrub resistance (washability). To make the paint film more hydrophobic, hydrophobic copolymer dispersant can be used to replace the polyacid dispersant in the grinding stage. However, the combination of hydrophobic dispersant with HASE provides insufficient dispersion of pigment in a painting composition as well as decreased long term viscosity stability.

Some grinding additives are used in a paint formulation such as U.S. Pat. Nos. 8,883,880B, 8,158,714B, EP1302515, AU2014200431, WO2014/040290A and U.S. Pat. No. 5,266,646. But it is still desirable to paint formulators a compatible composition of HASE and hydrophobic dispersant, which will provide improved dispersion of pigment in a painting composition as well as long term viscosity stability.

SUMMARY

One aspect of the present invention provides a multi-stage polymer comprising, a first stage polymer and a second stage polymer, wherein the first stage polymer comprises, as polymerization units, based on the total weight of the first stage polymer: (a) from 30 wt % to 70 wt % of an α,β-ethylenically unsaturated carboxylic acid monomer; (b) from 0.1 wt % to 50 wt % of a macromonomer characterized by the following formula: $H_2C=C(R^1)-CO_2-(CH_2CH_2-O)_n-(CHR^2CH_2-O)_m-R^3$ wherein $R^1$ is hydrogen atom or methyl group; $R^2$ is $C_1$-$C_2$ alkyl; $R^3$ is $C_8$-$C_{30}$ alkyl, $C_8$-$C_{16}$ alkylphenyl or $C_{13}$-$C_{36}$ aralkylphenyl; n and m are independently integer from 6 to 100 and 0 to 50, respectively, provided that n>=m and the sum of m and n is from 6 to 100, and (c) from 30 wt % to 70 wt % of an α,β-ethylenically unsaturated monomer excepting for α,β-ethylenically unsaturated carboxylic acid monomer and the macromonomer; and the second stage polymer comprises, as polymerization units, based on the total weight of the second stage polymer; (d) from 25 to 80 wt % of an α,β-ethylenically unsaturated carboxylic acid monomer; (e) from 0.1 to 50 wt % of a phosphorus containing monomer comprising phosphorus acid group or phosphate group, and (f) from 20 wt % to 75 wt % of an α,β-ethylenically unsaturated monomer excepting for α,β-ethylenically unsaturated carboxylic acid monomer and the phosphorus containing monomer, and both first stage polymer and second stage polymer are ionically-soluble polymer.

The multi-stage polymer of the present invention preferably comprises a first stage polymer containing an absence of the phosphorus containing monomer.

The first stage polymer of the present invention preferably has a weight average molecular weight of at least 50,000 Daltons, and the second stage polymer of the present invention preferably has a weight average molecular weight of from 500 to 20,000 Daltons.

Another aspect of the invention relates to a method for preparing a multi-stage polymer comprising the steps of: i) polymerizing a first stage polymer from a first monomer composition comprising (a) from 30 wt % to 70 wt % of an α,β-ethylenically unsaturated carboxylic acid monomer; (b) from 0.1 wt % to 50 wt % of a macromonomer characterized by the following formula: $H_2C=C(R^1)-CO_2-(CH_2CH_2-O)_n-(CHR^2CH_2-O)_m-R^3$ wherein $R^1$ is hydrogen atom or methyl group; $R^2$ is $C_1$-$C_2$ alkyl; $R^3$ is $C_8$-$C_{30}$ alkyl, $C_8$-$C_{16}$ alkylphenyl or $C_{13}$-$C_{36}$ aralkylphenyl; n and m are independently integer from 6 to 100 and 0 to 50, respectively, provided that n>=m and the sum of m and n is from 6 to 100, and (c) from 30 wt % to 70 wt % of an α,β-ethylenically unsaturated monomer excepting for α,β-ethylenically unsaturated carboxylic acid monomer and the macromonomer; to obtain a first stage polymer; ii) contacting the first stage polymer with a second monomer composition comprising, based on the weight of the second monomer composition: (d) from 25 to 80 wt % of an α,β-ethylenically unsaturated carboxylic acid monomer; (e) from 0.1 to 50 wt % of a phosphorus containing monomer comprising phosphorus acid group or phosphate group, and (f) from 20 wt % to 75 wt % of an α,β-ethylenically unsaturated monomer excepting for α,β-ethylenically unsaturated carboxylic acid monomer and the phosphorus containing monomer, and iii) polymerizing the second monomer composition to obtain a second stage polymer under the presence of the first stage polymer.

Further aspect of the invention is a polymer composition formed from a method comprising at least two polymerization steps, wherein the method comprises the steps of: i) polymerizing a first stage polymer from a first monomer composition under emulsion polymerization conditions, in which the first stage monomer composition comprises (a) from 30 wt % to 70 wt % of an α,β-ethylenically unsaturated carboxylic acid monomer; (b) from 0.1 wt % to 50 wt % of a macromonomer characterized by the following formula: $H_2C=C(R^1)-CO_2-(CH_2CH_2-O)_n-(CHR^2CH_2-O)_m-R^3$ wherein $R^1$ is hydrogen atom or methyl group; $R^2$ is $C_1$-$C_2$ alkyl; $R^3$ is $C_8$-$C_{30}$ alkyl, $C_8$-$C_{16}$ alkylphenyl or $C_{13}$-$C_{36}$ aralkylphenyl; n and m are independently integer from 6 to 100 and 0 to 50, respectively, provided that n>=m and the sum of m and n is from 6 to 100, and (c) from 30 wt % to 70 wt % of an α,β-ethylenically unsaturated monomer excepting for α,β-ethylenically unsaturated carboxylic acid monomer and the macromonomer; to obtain a first stage polymer; ii) contacting the first stage polymer with a second monomer composition comprising, based on the weight of the second monomer composition: (d) from 25 to 80 wt % of an α,β-ethylenically unsaturated carboxylic acid monomer; (e) from 0.1 to 50 wt % of a phosphorus containing monomer comprising phosphorus acid group or phosphate group, and (f) from 20 wt % to 75 wt % of an α,β-ethylenically unsaturated monomer excepting for α,β-ethylenically unsaturated carboxylic acid monomer and the phosphorus containing monomer, wherein the ratio of the first stage polymer to the second monomer composition is from 90:10 to 50:50, and iii) polymerizing the second monomer composition under emulsion polymerization conditions, to obtain a second stage polymer under the presence of the first stage polymer.

Further aspects of the invention relate to: a composition comprising the multi-stage polymer as an emulsion state; a paint composition comprising the multi-stage polymer, a binder, a pigment and an extender; a method of thickening a paint composition by incorporating the multi-stage polymer and neutralizing the multi-stage polymer, and a method of dispersing a pigment and an extender in a paint composition by incorporating the multi-stage polymer and neutralizing the multi-stage polymer.

BRIEF DESCRIPTION OF THE DRAWINGS

FIG. 1 is weight average molecular curve of Grinding Additives obtained by Examples 1 to 3 measured by Gel Permeation Chromatography

DETAILED DESCRIPTION

Exemplary embodiments in accordance with the present invention will be described. Various modifications, adaptations or variations of the exemplary embodiments described herein may become apparent to those skilled in the art as such are disclosed. It will be understood that all such modifications, adaptations or variations that rely upon the teachings of the present invention, and through which these teachings have advanced the art, are considered to be within the scope and spirit of the present invention.

As used herein and throughout the specification, the term "multi-stage polymer" means a composite polymer particle prepared by a sequential or staged polymerization process wherein first sequence or stage of monomer repeating units is polymerized before the subsequent or second sequence or stage of repeating units are polymerized.

As used herein, the term "(meth)acrylic" acid is meant to include both acrylic acid and methacrylic acid.

The multi-stage polymer of the present invention includes a first stage polymer, and a second stage polymer. The first stage polymer is a Hydrophobically-modified Alkali Soluble Emulsion (HASE) polymer, and comprises, as polymerization units, based on the total weight of the first stage polymer:
(a) from 30 wt. % to 70 wt. %, preferably from 35 wt. % to 50 wt. % of an α,β-ethylenically unsaturated carboxylic acid monomer;
(b) from 0.1 wt. % to 50 wt. %, preferably from 1 wt. % to 30 wt. %, and the most preferably from 2 wt. % to 15 wt. %, of a macromonomer; and
(c) from 30 wt. % to 70 wt. %, preferably from 30 wt. % to 65 wt. %, and the most preferably from 35 wt. % to 60 wt. %, of an α,β-ethylenically unsaturated monomer excepting for (a) and (b) above.

Optionally, the first stage polymer further comprises, as polymerization units, based on the total weight of the first stage polymer, g) from 0.01 wt. % to 5 wt. %, preferably from 0.03 wt. % to 1 wt. %, and most preferably from 0.05 wt. % to 0.5 wt. %, of a polyethyenically unsaturated crosslinking monomer.

The second stage polymer is a hydrophobic polymer dispersant, and comprises, as polymerization units, based on the total weight of the second stage polymer:
(d) from 25 wt. % to 80 wt. %, preferably from 25 wt. % to 70 wt. %, and the most preferably from 25 wt. % to 60 wt. %, of an α,β-ethylenically unsaturated carboxylic acid monomer;
(e) from 0.1 to 50 wt %, preferably from 1 wt. % to 30 wt. %, and the most preferably from 2 wt. % to 15 wt. %, of a phosphorus containing monomer comprising phosphorus acid group or phosphate group; and
(f) from 20 wt. % to 75 wt. %, preferably from 25 wt. % to 75 wt. %, and most preferably from 25 wt. % to 60 wt. %, of an α,β-ethylenically unsaturated monomer excepting for (d) and (e) above.

Both the first stage polymer and the second stage polymer are ionically-soluble polymer.

The proportions of the monomers in the first stage polymer can vary widely within above mentioned ranges to obtain thickening agents possessing a variety of rheological properties. The resulting first stage polymer, upon neutralization of at least a portion of the carboxyl groups, can be soluble in water and thicken the paint.

The proportions of the monomers in the second stage polymer can vary widely within the above mentioned ranges to achieve requested balance of dispersion efficiency and hydrophobicity. The resulting second stage polymer, upon neutralization of at least a portion of the carboxyl groups, can be soluble in water and disperse pigment and extenders in the grinding stage of paint making process.

In the multi-stage polymer composite of the present invention, the first stage polymer can vary from 1% to 99% by weight, and the second stage polymer can also vary from 1% to 99% by weight, based on the total weight of the multi-stage polymer composite. It is preferred for the first stage polymer being from 30% to 90% by weight, and the second stage polymer being from 10% to 70% by weight, while most preferably, the first stage polymer is from 40% to 65% by weight, and the second stage polymer is from 35% to 60% by weight.

The first stage polymer has a weight average molecular weight of at least 50,000 Daltons as determined by gel permeation chromatography. To provide most effective thickening with polymers which are water-soluble when neutralized, molecular weight within the range of from 80,000 to 5,000,000 Daltons is preferred, while most preferably, it is from 100,000 to 1,000,000 Daltons. The second stage polymer has a weight average molecular weight of from 500 to 20,000 Daltons as determined by gel permeation chromatography. To provide most effective dispersing with polymers which are water-soluble when neutralized, molecular weights within the range of from 800 to 15,000 Daltons is preferred, while most preferably, it is from 1,000 to 10,000 Daltons. Weight average molecular weight, $M_w$, is measured by gel permeation chromatography (GPC) using polyacrylic acid standards, as is known in the art. The techniques of GPC are discussed in detail in "Modern Size Exclusion Chromatography", W. W. Yau, J. J. Kirkland, D. D. Bly; Wiley-Interscience, 1979, and in "A Guide to Materials Characterization and Chemical Analysis", J. P. Sibilia; VCH, 1988, p. 81-84. The molecular weights reported herein are all in weight average molecular weights and are all in units of Dalton.

The macromonomer of the present invention has the formula:

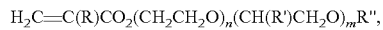

$H_2C=C(R)CO_2(CH_2CH_2O)_n(CH(R')CH_2O)_mR''$, wherein R is H or $CH_3$, R' is $C_1$-$C_2$ alkyl; R" is $C_8$-$C_{30}$ alkyl, $C_8$-$C_{16}$ alkylphenyl or $C_{13}$-$C_{36}$ aralkylphenyl; n is an integral number from 6 to 100 and m is an integral number from 0 to 50, provided that n≥m and m+n is from 6 to 100. Preferably, m=0, and n is an integral number from 10 to 60; and most preferably, m=0, and n is an integral number from 20 to 40.

Suitable examples of the macromonomer include, but are not limited to, SIPOMER™ BEM (50% active), SIPOMER™ SEM-25 (60% active), SIPOMER™ HPM-100 (50% active), SIPOMER™ HPM-200 (50% active), SIPOMER™ HPM-400 (50% active), available from Rhodia, and MA-20 (70% active), available from Dow Chemical Company. Preferably used examples are SIPOMER™ BEM (50% active), SIPOMER™ HPM-400 (50% active), and MA-20 (70% active). In general, more macromonomers will lead to stronger associative thickening behavior with the binder particles.

The phosphorus containing monomer comprising phosphorus acid group or phosphate group of the present invention does not include phosphonate. The phosphorus containing monomers are dihydrogen phosphate esters of an alcohol in which the alcohol contains or is substituted with a polymerizable vinyl or olefinic group. Suitable examples of the phosphorus-containing monomers include, but are not limited to, phosphoalkyl (meth)acrylates such as phosphoethyl (meth)acrylate, phosphopropyl (meth)acrylate, phosphobutyl (meth)acrylate, and salts thereof; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, and salts thereof; and any combinations thereof. The phosphorous-containing monomers preferably are selected from mono- or di-ester of phosphoalkyl (meth)acrylates, more preferably are mono- or di-ester of phosphoethyl methacrylate, and most preferably are phosphoethyl methacrylate (PEM).

The first stage polymer contains a substantial absence of the phosphorous containing monomer (i.e., less than 1 part by weight, preferably less than 0.1 part, more preferably less than 0.01 part, of the phosphorous containing monomer per 100 parts by weight of the phosphorous containing monomer in the second stage polymer). In a most preferred embodiment, the first stage polymer contains an absence of the phosphorous containing monomer.

The α,β-ethylenically unsaturated carboxylic acid monomers are α,β-ethylenically unsaturated monomers containing at least one carboxylic acid group. α,β-ethylenically unsaturated carboxylic acid monomers suitably used in the present invention include, but are not limited to, monobasic acids, such as acrylic, methacrylic, crotonic, and acyloxypropionic acid; and dibasic acid monomers, such as maleic, fumaric, and itaconic acid. Dibasic acid monomers, when applying, are used in place of a portion, e.g. up to about 10 weight percent, of the monobasic acid. Monomers which are monoesters of dibasic acids, such as the monobutyl ester of maleic acid can also be used. Preferably used examples are acrylic acid, methacrylic acid, and a combination thereof. In general, the higher level of acid monomers will provide stronger thickening to the aqueous phase.

The α,β-ethylenically unsaturated monomers suitably used in the present invention include, but are not limited to, (meth)acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride, vinylidene chloride. The most preferably used examples are ethyl acrylate, methyl methacrylate, 2-hydroxybutyl acrylate, 2-hydroxyethyl methacrylate, 2-hydroxypropyl methacrylate, vinyl acetate and acrylonitrile and a combination thereof.

Polyethylenically unsaturated cross-linking monomers are optional in the first stage polymer's polymerization. They work as crosslinkers that are utilized to generate a polymer having either a partially or substantially crosslinked three-dimensional network. Exemplary polyethylenically unsaturated cross-linking monomers include, but are not limited to, di(meth)acrylate compounds such as ethylene glycol di(meth)acrylate, polyethylene glycol di(meth)acrylate, triethylene glycol di(meth)acrylate, 1,3-butylene glycol di(meth)acrylate, 1,6-butylene glycol di(meth)acrylate, 1,6-hexanediol di(meth)acrylate, neopentyl glycol di(meth)acrylate, 1,9-nonanediol di(meth)acrylate, 2,2'-bis(4-(acryloxypropyloxyphenyl)propane, 2,2'-bis(4-(acryloxydiethoxyphenyl)propane, and zinc acrylate (i.e., $2(C_3H_3O_2)Zn^{++}$); tri(meth)acrylate compounds such as, trimethylolpropane tri(meth)acrylate, trimethylolethane tri(meth)acrylate, and tetramethylolmethane tri(meth)acrylate; tetra(meth)acrylate compounds such as ditrimethylolpropane tetra(meth)acrylate, tetramethylolmethane tetra(meth)acrylate, and pentaerythritol tetra(meth)acrylate; hexa(meth)acrylate compounds such as dipentaerythritol hexa(meth)acrylate; allyl compounds such as allyl (meth)acrylate, diallylphthalate, diallyl itaconate, diallyl fumarate, and diallyl maleate; polyallyl ethers of sucrose having from 2 to 8 allyl groups per molecule, polyallyl ethers of pentaerythritol such as pentaerythritol diallyl ether, pentaerythritol triallyl ether, and pentaerythritol tetraallyl ether; polyallyl ethers of trimethylolpropane such as trimethylolpropane diallyl ether and trimethylolpropane triallyl ether. Other suitable polyethylenically unsaturated cross-linking monomers include divinyl glycol, divinyl benzene, and methylenebisacrylamide.

Preferably, the suitable examples of polyethylenically unsaturated cross-linking monomers are ethylene glycol di(meth)acrylate, ally (meth)acrylate, diallyphthalate, and the composition thereof.

In another aspect, suitable polyethylenically unsaturated cross-linking monomers can be synthesized via an esterification reaction of a polyol made from ethylene oxide or propylene oxide or combinations thereof with unsaturated anhydride such as maleic anhydride, citraconic anhydride, itaconic anhydride, or an addition reaction with unsaturated isocyanate such as 3-isopropenyl-a-a-dimethylbenzene isocyanate.

In addition, the following unsaturated compounds can be utilized as crosslinkers which are reactive with pendant carboxyl groups on the polymer backbone: polyhaloalkanols such as 1,3-dichloroisopropanol and 1,3-dibromoisopropanol; sulfonium zwitterions such as the tetrahydrothiophene adduct of novolac resins; haloepoxyalkanes such as epichlorohydrin, epibromohydrin, 2-methyl epichlorohydrin, and epiiodohydrin; polyglycidyl ethers such as 1,4-butanediol diglycidyl ether, glycerine-1,3-diglycidyl ether, ethylene glycol diglycidyl ether, propylene glycol diglycidyl ether, diethylene glycol diglycidyl ether, neopentyl glycol diglycidyl ether, polypropylene glycol diglycidyl ethers, bisphenol A-epichlorohydrin epoxy resins and mixtures of the foregoing. Mixtures of two or more of the foregoing polyunsaturated compounds can also be utilized to crosslink the first stage polymer component of the present invention.

The multi-stage grinding additive of the present invention can be conveniently prepared by using the above-described monomers and by conventional staged- or sequential-emulsion polymerization techniques at an acid pH lower than about 5.0 using free-radical producing initiators, usually in an amount from 0.01 percent to 3 percent based on the total weight of the monomers. Polymerization at an acid pH lower than about 5.0 permits direct preparation of an aqueous colloidal dispersion with relatively high solids content without problems of undue viscosity.

The first stage polymer is synthesized in a first emulsion polymerization stage from a monomer mixture emulsified in an aqueous phase of a first monomer composition comprising a), b), c), and optionally g), as disclosed above. The emulsified first monomers are polymerized in the presence of a suitable free radical forming initiator to provide an emulsion of a HASE stage polymer. Correspondingly, a second stage polymer is formed in a second emulsion polymerization stage. In this second stage, an emulsified monomer mixture of a second monomer composition comprising d), e) and f), as previously disclosed, is polymerized in the presence of the previously prepared first stage polymer and additional free radical forming initiator. The end-product is a multi-stage polymer composite comprising a HASE surrounded or partially surrounded with a dispersant. Alternatively, a preformed HASE seed emulsion polymer can be utilized as the first stage polymer followed by the formation of the second stage polymer in a second stage as described above.

The emulsified monomer mixture of the first monomer composition contains a substantial absence of the phosphorus containing monomer (i.e., less than 1 part by weight, preferably less than 0.1 part, more preferably less than 0.01 part, of the phosphorus containing monomer per 100 parts by weight of the phosphorus containing monomer in the second stage polymer). In a most preferred embodiment, the first monomer composition contains an absence of the phosphorus containing monomer.

Each stage of the multi-stage polymer of the invention can be prepared from a monomer mixture comprising one or more chain transfer agents. The chain transfer agent can be any chain transfer agent which reduces the molecular weight of the staged polymers of the invention. Suitable chain transfer agents include, but are not limited to, thio and disulfide containing compounds, such as $C_1$-$C_{18}$ alkyl mercaptans, mercaptocarboxylic acids, mercaptocarboxylic esters, thioesters, $C_1$-$C_{18}$ alkyl disulfides, aryldisulfides, polyfunctional thiols such as trimethylolpropane-tris-(3-mercaptopropionate), pentaerythritol-tetra-(3-mercaptopropionate), pentaerythritol-tetra-(thioglycolate), and pentaerythritol-tetra-(thiolactate), dipentaerythritol-hexa-(thioglycolate), and the like; phosphites and hypophosphites; haloalkyl compounds, such as carbon tetrachloride, bromotrichloromethane, and the like; and catalytic chain transfer agents such as, for example, cobalt complexes (e.g., cobalt (II) chelates).

In one aspect of the invention, the chain transfer agent is selected from octyl mercaptan, n-dodecyl mercaptan, t-dodecyl mercaptan, hexadecyl mercaptan, octadecyl mercaptan (ODM), isooctyl 3-mercaptopropionate (IMP), butyl 3-mercaptopropionate, 3-mercaptopropionic acid, butyl thioglycolate, isooctyl thioglycolate, and dodecyl thioglycolate. When utilized, the chain transfer agent can be present in an amount ranging from about 0.1% to 10% by weight, based on the total monomer mixture weight.

The emulsion polymerization can be carried out in a staged batch process, in a staged metered monomer addition process, or the polymerization can be initiated as a batch process and then the bulk of the monomers can be continuously staged into the reactor (seed process). Typically, the polymerization process is carried out at a reaction temperature in the range of about 20 to about 99° C., however, higher or lower temperatures can be used. To facilitate emulsification of the monomer mixture, the emulsion polymerization is carried out in the presence of at least one surfactant. In one embodiment, the emulsion polymerization is carried out in the presence of surfactant ranging in the amount of about 1% to about 10% by weight in one aspect, from about 3% to about 8% in another aspect, and from about 3.5% to about 7% by weight in a further aspect, based on a total emulsion weight basis. The emulsion polymerization reaction mixture also includes one or more free radical initiators which are present in an amount ranging from about 0.01% to about 3% by weight based on total monomer weight. The polymerization can be performed in an aqueous or aqueous alcohol medium.

Surfactants for facilitating emulsion polymerizations include anionic, nonionic, amphoteric, and cationic surfactants, as well as mixtures thereof. Most commonly, anionic and nonionic surfactants can be utilized as well as mixtures thereof.

Suitable anionic surfactants for facilitating emulsion polymerizations are well known in the art and include, but are not limited to, sodium lauryl sulfate, sodium dodecyl benzene sulfonate, sodium ($C_6$-$C_{16}$) alkyl phenoxy benzene sulfonate, disodium ($C_6$-$C_{16}$) alkyl phenoxy benzene sulfonate, disodium ($C_6$-$C_{16}$) di-alkyl phenoxy benzene sulfonate, disodium laureth-3 sulfosuccinate, sodium dioctyl sulfosuccinate, sodium di-sec-butyl naphthalene sulfonate, disodium dodecyl diphenyl ether sulfonate, disodium n-octadecyl sulfosuccinate, phosphate esters of branched alcohol ethoxylates, and the like.

Nonionic surfactants suitable for facilitating emulsion polymerizations are well known in the polymer art, and include, without limitation, linear or branched $C_8$-$C_{30}$ fatty alcohol ethoxylates, such as capryl alcohol ethoxylate, lauryl alcohol ethoxylate, myristyl alcohol ethoxylate, cetyl alcohol ethoxylate, stearyl alcohol ethoxylate, cetearyl alcohol ethoxylate, sterol ethoxylate, oleyl alcohol ethoxylate, and, behenyl alcohol ethoxylate; alkylphenol alkoxylates, such as octylphenol ethoxylates; and polyoxyethylene polyoxypropylene block copolymers, and the like. Additional fatty alcohol ethoxylates suitable as non-ionic surfactants are described below. Other useful nonionic surfactants include $C_8$-$C_{22}$ fatty acid esters of polyoxyethylene glycol, ethoxylated mono- and diglycerides, sorbitan esters and ethoxylated sorbitan esters, $C_8$-$C_{22}$ fatty acid glycol esters, block copolymers of ethylene oxide and propylene oxide, and combinations thereof. The number of ethylene oxide units in each of the foregoing ethoxylates can range from 2 and above in one aspect, and from 2 to about 150 in another aspect.

Exemplary free radical initiators include, but are not limited to, water-soluble inorganic persulfate compounds, such as ammonium persulfate, potassium persulfate, and sodium persulfate; peroxides such as hydrogen peroxide, benzoyl peroxide, acetyl peroxide, and lauryl peroxide; organic hydroperoxides, such as cumene hydroperoxide and t-butyl hydroperoxide; organic peracids, such as peracetic acid; and oil soluble, free radical producing agents, such as 2,2'-azobisisobutyronitrile, and the like, and mixtures thereof. Peroxides and peracids can optionally be activated with reducing agents, such as sodium bisulfite, sodium formaldehyde, or ascorbic acid, transition metals, hydrazine, and the like. Particularly suitable free-radical polymerization initiators include water soluble azo polymerization initiators, such as 2,2'-azobis(tert-alkyl) compounds having a water solubilizing substituent on the alkyl group. Preferred azo polymerization catalysts include the Vazo® free-radical polymerization initiators, available from DuPont, such as Vazo® 44 (2,2'-azobis(2-(4,5-dihydroimidazolyl)propane), Vazo® 56 (2,2'-azobis(2-methylpropionamidine) dihydrochloride), and Vazo® 68 (4,4'-azobis(4-cyanovaleric acid)).

Optionally, other emulsion polymerization additives and processing aids which are well known in the emulsion polymerization art, such as auxiliary emulsifiers, solvents, buffering agents, chelating agents, inorganic electrolytes, polymeric stabilizers, and pH adjusting agents can be included in the polymerization system.

In a typical two-stage polymerization, a mixture of first stage monomers is added to a first reactor under inert atmosphere to a solution of emulsifying surfactant (e.g., anionic surfactant) in water. Optional polyethylenically unsaturated cross-linking monomers, and processing aids can be added as desired (e.g., auxiliary emulsifier(s)). The contents of the reactor are agitated to prepare a monomer emulsion. To a second reactor equipped with an agitator, an inert gas inlet, and feed pumps are added under inert atmosphere a desired amount of water and additional anionic surfactant and optional processing aids. The contents of the second reactor are heated with mixing agitation. After the contents of the second reactor reaches a temperature in the range of about 55 to 98° C., a free radical initiator is injected into the so formed aqueous surfactant solution in the second reactor, and a portion of the monomer emulsion from the first reactor is gradually metered into the second reactor over a period typically ranging from about one half to about four hours. The reaction temperature is controlled in the range of about 45 to about 95° C. After the addition of the first stage monomer, an additional quantity of free radical initiator can optionally be added to the second reactor, if desired, and the resulting reaction mixture is typically held at a temperature of about 45 to 95° C. for a time period sufficient to accomplish the polymerization reaction and obtain a first stage polymer particle emulsion.

While a typical two-stage polymer process is generally described immediately above, multi-staged or multi-layered polymers can be formed through the sequential emulsion polymerization of monomer charges in the presence of polymer particles of a previously formed emulsion polymer.

The polymer composite preferably comprises all the polymer stages which are base-soluble. "Base-soluble" as used herein means that the polymer is substantially soluble in aqueous medium which has been adjusted with base to a pH of about 5.0 or greater. This neutralization can occur in situ when the multi-stage polymer composite is blended with an aqueous solution containing a suitable base.

The multi-stage polymer composite of the present invention can be added, as a grinding additive in the grinding stage at a content range of from 0.1% to 2%, preferably from 0.3% to 1.5%, and most preferably from 0.6% to 1.0% by weight based on the total weight of the coating composition, and binder and other additives can be added in the letdown stage, to make a coating formulation. Coating formulations include, but are not limited to, latex paint formulations, cosmetic formulations, dentifrices, hand lotions, automotive coatings formulations, architectural and industrial coatings formulations, caulks, adhesives, and sealants.

Examples of suitable binders include, but are not limited to, acrylic-, vinyl-acrylic-, styrene-acrylic, vinyl acetate/ethylene-, urethane-, melamine-, epoxy-, alkyd-, acrylonitrile-, styrene-, polybutadiene-, polyisoprene-, ethylene-propylene-, polyvinyl alcohol-, vinyl chloride-, vinylidene chloride-, epoxy-based homopolymers and copolymers, and blends of binders. The binder is typically present in the formulation at levels ranging from 2 to 50% by weight, based on the total weight of the coating formulation. The coating formulation may also include colorants containing colored pigments that provide tint to coating compositions such as paints and semitransparent stains. One factor affecting the amount of colorant added to a coating composition to obtain a desired color is the light scattering efficiency and the light absorbing efficiency of the colored pigments. The scattering and absorbing efficiencies of colored pigments are affected by the extent of dispersion of the colored pigments in the coating composition. Colored pigment particles that are well dispersed and separated from each other are believed to provide increased color and optionally, increased hiding. The coating formulation can be formulated to a desired color with lower levels of the colored pigments than compositions in which the colored pigments are poorly dispersed. Alternatively, a coating formulation having well dispersed colored pigments typically display more intense colors, and permit the preparation of colored coatings with a broader color palette.

The coating composition according to the present invention may further include one or more of the following additives: Solvents; fillers; pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated opacifying pigment particles such as titanium dioxide, zinc oxide, or lithopone particles; polymers or polymer emulsions adsorbing or bonding to the surface of pigments such as titanium dioxide; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

For example, the coatings composition may include polymer-encapsulated opacifying pigment particles comprising i) opacifying pigment particles, such as titanium dioxide particles, having a diameter in the range of 100 nm to 500 nm and an index of refraction of at least 1.8; ii) an encapsulating polymer, and iii) a polymeric dispersant for the encapsulated opacifying pigment particles and the polymer. Such polymer-encapsulated opacifying pigment particles are described, for example, in U.S. Patent Publication US 2010/0298483 A1. In another example, the coating composition may include polymer-encapsulated opacifying pigment particles as described in WO 2007/112503 A1.

A coating formulation that provides a colored coating having a higher degree of opacity, a measure of substrate covering power, may be desired. A formulation suitable for providing colored coatings having a higher degree of color saturation, a measure of color intensity, may also be desired. Alternatively, a formulation that can be tinted to a desired color with lower level of colorants than conventional coating formulations may also be desired. A coating formulation having less variation in the efficiencies of a range of different colorant particles, to provide consistent colors when mixtures of colorant particles are employed, may also be desired.

The pigment particles contained in the formulation are white and nonwhite pigments. The colorant particles provide any color including white to the coating composition. Colorant particles include colored pigments, white pigments, black pigments, metal effect pigments, and luminescent pigments such as fluorescent pigments and phosphorescent pigments. The term "colorant particles", as used herein includes white pigment particles such as titanium dioxide, zinc oxide, lead oxide, zinc sulfide, lithophone, zirconium oxide, and antimony oxide. Examples of colors for the pigmented polymer composition include black, magenta, yellow, and cyan, as well as combinations of these colors such as orange, blue, red, pink, green, and brown. Other suitable colors for the pigmented polymer composition include fluorescent colors; metallic colors such as silver, gold, bronze, and copper; and pearlescent pigments. These colors are obtained by employing one or more different types of colorant particles.

The colorant particles include inorganic colorant particles and organic colorant particles. Typically, the colorant particles have average particle diameters in the range of from 10 nm to 50 µm, preferably in the range of from 40 nm to 2 µm.

Suitable inorganic colorant particles include, but are not limited to, titanium dioxide pigments, iron oxide pigments such as goethite, lepidocrocite, hematite, maghemite, and magnetite; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green; chromate and molybdate pigments such as chromium yellow, molybdate red, and molybdate orange; ultramarine pigments; cobalt oxide pigments; nickel antimony titanates; lead chrome; blue iron pigments; carbon black; and metal effect pigments such as aluminum, copper, copper oxide, bronze, stainless steel, nickel, zinc, and brass.

Suitable organic colorant particles include, but are not limited to, azo pigments, monoazo pigments, diazo pigments, azo pigment lakes, β-naphthol pigments, naphthol AS pigments, benzimidazolone pigments, diazo condensation pigment, metal complex pigments, isoindolinone, and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, and diketopyrrolo pyrrole pigments.

Suitable extender include, but are not limited to a particulate inorganic material having a refractive index of less than or equal to 1.8 and greater than 1.3 and includes, for example, calcium carbonate, clay, calcium sulfate, aluminosilicates, silicates, zeolites, mica, diatomaceous earth, solid or hollow glass, and ceramic beads. The aqueous coating composition may optionally contain solid or hollow polymeric particles having a Tg of greater than 60° C., such polymeric particles are classified as extenders for purposes of PVC calculations herein. The details of hollow polymeric particles are described in EP22633, EP915108, EP959176, EP404184, U.S. Pat. No. 5,360,827, WO 00/68304, and US20100063171. The solid polymeric particles have particle size from 1-50 microns, preferably from 5-20 microns.

EXAMPLES

I. Raw Materials

TABLE 1

Materials used in making Polymer compound

| Compound | Chemical nature | Supplier |
| --- | --- | --- |
| EA | Ethyl acrylate | Evonik Industry |
| MAA | Methacrylic acid | Evonik Industry |
| MA-20 | A mixture of 70% methacrylate ester of a 20~30 ethoxylate of hexadecyl or stearyl alcohol, and 20% methacrylic acid | The Dow Chemical Company |
| BMA | Butyl methacrylate | Sinopharm Chemical Reagent Co., Ltd. |
| EHA | 2-Ethylhexyl acrylate | Evonik Industry |
| PEM | Phosphoethyl methacrylate | The Dow Chemical Company |
| nDDM | n-Dodecylmercaptan | The Dow Chemical Company |
| MMP | Methyl 3-mercapto-propionate | TCI Company |
| Disponil ™ Fes32 | Fatty polyglycol ether sulphate, $Na^+$ salt | The Dow Chemical Company |
| $FeSO_4 \cdot 7H_2O$ | Ferrous sulfate heptahydrate | Sinopharm Chemical Reagent Co., Ltd. |
| APS | Ammonium persulfate | The Dow Chemical Company |
| t-BHP | tert-Butyl hydroperoxide | The Dow Chemical Company |
| IAA | Isoascorbic acid | The Dow Chemical Company |
| NaOAc | Sodium acetate | The Dow Chemical Company |
| Kathon ™ LX 1.5% | Methyl and cloroisothiazolinone | The Dow Chemical Company |

TABLE 2

Starting materials used in paint formulation

| Material | Function | Supplier |
| --- | --- | --- |
| Natrosol ™ 250HBR | thickener | Ashland Aqualon Company |
| Orotan ™ 1288 | dispersant | The Dow Chemical Company |
| Orotan ™ 731A | dispersant | The Dow Chemical Company |
| Acrysol ™ GA-118 | Grinding Additive | The Dow Chemical Company |
| AMP-95 | base | The Dow Chemical Company |
| Propylene glycol | antifreeze | Sinopharm Chemical Reagent Co., Ltd. |
| Kathon ™ LXE biocide | biocide | The Dow Chemical Company |
| Triton ™ CF-10 | surfactant | The Dow Chemical Company |
| Nopco ™ NXZ | defoamer | Cognis Corporation |
| Ti-pure R-902 | pigment | DuPont Company |

TABLE 2-continued

Starting materials used in paint formulation

| Material | Function | Supplier |
| --- | --- | --- |
| Honcal 3 (800 mesh) (CC-700) | extender | Guangfu Building Materials Group (China) |
| Kaolin clay (DB-80) | extender | Shanxi Jinyang Calcined Kaolin Ltd. |
| Primal ™ AS-356 emulsion | binder | The Dow Chemical Company |
| TEXANOL ™ ester alcohol | coalescent | Eastman Chemical Company |

II. Processes

Performance Evaluation Methods i) Viscosity

The formulated paints were obtained as control formulation and inventive formulation.

"KU viscosity" is a measure of the mid-shear viscosity as measured by a Krebs viscometer. The Krebs viscometer is a rotating paddle viscometer that is compliant with ASTM-D562. KU viscosity was measured on a Brookfield Krebs Unit Viscometer KU-1+ available from Brookfield Engineering Labs (Middleboro, Mass., USA). "KU" shall mean Krebs unit.

"ICI" is high shear viscosity, expressed in units of poise (P), and measured by the ICI cone-plate viscometer.

"Brookfield 4/6" is the low-shear viscosity, expressed in units of centipoises (cP), and measured on a Brookfield viscometer at a low-shear rate, 6 rpm, with spindle 4. The Brookfield viscosity of the paint typically correlates with the "in-can appearance" of the paint.

ii) Hear Age Stability (Stability after Heat-Age Storage)

The stability of paints after heat-age storage is determined by the following method: A paint is stored for certain days in 50° C. refrigerator. Then the paint is placed standing (no stirring) at constant temperature to recover to 25° C. The appearances of paints before and after the freeze/thaw cycles are monitored and compared. The freeze/thaw cycles are tested parallel by five times in total.

III. Experimental Examples

Example 1 (Comparative Example)—Multi-Stage Polymer 1

This example illustrates the preparation of a multi-stage polymer, without comprising phosphorus containing monomer (PEM) with weight composition: 70 (47 EA/48 MAA/5 MA-20//0.08 n-DDM)//30 (70 EHA/30 MAA/2.55 MMP).

A five-liter, four-necked flask equipped with a mechanical stirrer, nitrogen sweep, thermocouple, and condenser was charged with 720 grams of water and 34.32 grams of Disponil™ Fes32. The kettle solution was heated at 86° C. An initiator, 1.30 grams APS dissolved in 26 grams of water, was added. Two minutes later, the first-stage monomer emulsion, 408.60 grams of ethyl acrylate (EA), 405.10 grams of methacrylic acid (MAA), 62.10 grams of MA-20, 0.70 grams of nDDM and 24.03 grams of Disponil™ Fes32 in 630 grams of water were fed. Simultaneously, an initiator, 0.37 grams of APS dissolved in 77 grams of water, were co-fed over a period of 60 minutes while the kettle temperature was maintained at 86° C. After 60 minutes, the second-stage monomer emulsion, (244.95) grams of 2-ethylhexyl acrylate, (104.98) grams of methacrylic acid, (8.92) grams of MMP, and (19.19) grams of Disponil™ Fes32 in 225 grams of water, and an initiator, 1.05 grams of APS, 2.19 grams of sodium acetate and 70 grams of water, were co-fed over a period of 30 minutes while the kettle temperature was maintained at 86° C. The kettle temperature was held at 86° C. for 5 minutes after the end of the feeds and then cooled to 60° C. A chaser system, 4.00 grams of ferrous sulfate solution (0.2% aq), 1.66 grams of tert-butyl hydroperoxide (t-BHP) in 14 grams of water and 0.83 grams of isoascorbic acid (IAA) in 22 grams of water were then added. After holding at 60° C. for 15 minutes, the same chaser system was charged again. The batch was cooled down to 40° C., and a biocide solution of 7.41 grams of Kathon™ LX 1.5% in 28 grams of water was added over 10 minutes. After completion of the polymerization, the copolymer emulsion was cooled to ambient temperature and filtered through a 325 mesh size screen. The resulting emulsion polymer had total solids of 35.5% at pH around 3 to 4.

Example 2 (Working Example)—Multi-Stage Polymer 2

This example illustrates the preparation of a multi-stage polymer of the present invention for use as a grinding additive with weight composition: 70 (47 EA/48 MAA/5 MA-20//0.08 n-DDM)//30 (65 EHA/30 MAA/5 PEM//2.55 MMP).

A five-liter, four-necked flask equipped with a mechanical stirrer, nitrogen sweep, thermocouple, and condenser was charged with 705 grams of water and 24.04 grams of Disponil™ Fes32. The kettle solution was heated at 86° C. An initiator, 1.30 grams APS dissolved in 15 grams of water, was added. Two minutes later, the first-stage monomer emulsion, 286.02 grams of ethyl acrylate (EA), 283.57 grams of methacrylic acid (MAA), 43.47 grams of MA-20, 0.49 grams of nDDM and 16.82 grams of Disponil™ Fes32 in 350 grams of water was fed. Simultaneously, an initiator, 0.37 grams of APS dissolved in 70 grams of water, were co-fed over a period of 60 minutes while the kettle temperature was maintained at 86° C. After 60 minutes, the second-stage monomer emulsion, 159.23 grams of 2-ethylhexyl acrylate, 73.49 grams of methacrylic acid, 12.25 grams of PEM, 6.25 grams of MMP, and 13.43 grams of Disponil™ Fes32 in 130 grams of water, and an initiator, 1.05 grams of APS, 1.53 grams of sodium acetate and 80 grams of water, were co-fed over a period of 30 minutes while the kettle temperature was maintained at 86° C. The kettle temperature was held at 86° C. for 5 minutes after the end of the feeds and then cooled to 60° C. A chaser system, 4.00 grams of ferrous sulfate solution (0.2% aq), 1.16 grams of tert-butyl hydroperoxide (t-BHP) in 10 grams of water and 0.58 grams of isoascorbic acid (IAA) in 10 grams of water were then added. After holding at 60° C. for 15 minutes, the same chaser system was charged again. The batch was cooled down to 40° C., and a biocide solution of 7.41 grams of Kathon™ LX 1.5% in 28 grams of water was added over 10 minutes. After completion of the polymerization, the copolymer emulsion was cooled to ambient temperature and filtered through a 325 mesh size screen. The resulting emulsion polymer had total solids of 35.0% at pH around 3 to 4.

Example 3 (Working Example)—Multi-Stage Polymer 3

This example illustrates the preparation of a multi-stage polymer of the present invention for use as a grinding additive with weight composition: 70 (47 EA/48 MAA/5 MA-20//0.08 n-DDM)//30 (65 EHA/30 MAA/5 PEM//4.29 nDDM).

A five-liter, four-necked flask equipped with a mechanical stirrer, nitrogen sweep, thermocouple, and condenser was charged with 705 grams of water and 24.04 grams of Disponil™ Fes32. The kettle solution was heated at 86° C. An initiator, 1.30 grams APS dissolved in 15 grams of water, was added. Two minutes later, the first-stage monomer emulsion, 286.02 grams of ethyl acrylate (EA), 283.57 grams of methacrylic acid (MAA), 43.47 grams of MA-20, 0.49 grams of nDDM and 16.82 grams of Disponil™ Fes32 in 350 grams of water was fed. Simultaneously, an initiator, 0.37 grams of APS dissolved in 70 grams of water, were co-fed over a period of 60 minutes while the kettle temperature was maintained at 86° C. After 60 minutes, the second-stage monomer emulsion, (159.23) grams of 2-ethylhexyl acrylate, (73.49) grams of methacrylic acid, (12.25) grams of PEM, (10.51) grams of nDDM, and (13.43) grams of Disponil™ Fes32 in (130) grams of water, and an initiator, 1.05 grams of APS, 1.53 grams of sodium acetate and 80 grams of water, were co-fed over a period of 30 minutes while the kettle temperature was maintained at 86° C. The kettle temperature was held at 86° C. for 5 minutes after the end of the feeds and then cooled to 60° C. A chaser system, 4.00 grams of ferrous sulfate solution (0.2% aq), 1.16 grams of tert-butyl hydroperoxide (t-BHP) in 10 grams of water and 0.58 grams of isoascorbic acid (IAA) in 10 grams of water were then added. After holding at 60° C. for 15 minutes, the same chaser system was charged again. The batch was cooled down to 40° C., and a biocide solution of 7.41 grams of Kathon™ LX 1.5% in 28 grams of water was added over 10 minutes. After completion of the polymerization, the copolymer emulsion was cooled to ambient temperature and filtered through a 325 mesh size screen. The resulting emulsion polymer had total solids of 34.8% at pH around 3 to 4.

TABLE 3

Grinding additive composition (Examples 1 to 3)

| No. | Grinding additive | HASE stage composition | Dispersant stage composition |
|---|---|---|---|
| Example 1 | multi-stage polymer 1 | 70 (47 EA/48 MAA/5 MA-20//0.08 n-DDM) | 30 (70 EHA/30 MAA/2.55 MMP) |
| Example 2 | multi-stage polymer 2 | 70 (47 EA/48 MAA/5 MA-20//0.08 n-DDM) | 30 (65 EHA/30 MAA/5 PEM//2.55 MMP) |
| Example 3 | multi-stage polymer 3 | 70 (47 EA/48 MAA/5 MA-20//0.08 n-DDM) | 30 (65 EHA/30 MAA/5 PEM//4.29 nDDM) |

Weight average molecular curves of obtained three compositions (Examples 1 to 3) are shown in the FIGURE. Referring to the FIGURE, the three multi-stage polymers are designed to have similar molecular weights, and are confirmed by aqueous Gel Permeation Chromatography (GPC) test. The peaks of the least molecular weight areas indicate some oligomers in the composition. The other bimodal of peaks indicate the dispersant and thickener part of Grinding Additive.

IV. Paint Formulations

TABLE 4

| | Conventional example | Comparative example | Inventive example | Inventive example |
|---|---|---|---|---|
| | | Formulation Series | | |
| Material Name | A | B | C | D |
| Grind | | | | |
| Water | 250.00 | 250.00 | 250.00 | 250.00 |
| Natrosol ™ 250HBR | 5.32 | — | — | — |
| Orotan ™ 1288 | 8.17 | — | — | — |
| multi-stage polymer 1 | — | 6.00 | — | — |
| multi-stage polymer 2 | — | — | 6.00 | — |
| multi-stage polymer 3 | — | — | — | 6.00 |
| AMP-95 | 1.05 | 1.70 | 1.70 | 1.70 |
| Propylene glycol | 20.00 | 20.00 | 20.00 | 20.00 |
| Kathon ™ LXE | 1.05 | 1.05 | 1.05 | 1.05 |
| Triton ™ CF-10 | 2.60 | 2.60 | 2.60 | 2.60 |
| Nopco ™ NXZ | 1.05 | 1.05 | 1.05 | 1.05 |
| Ti-Pure R-902 | 50.00 | 50.00 | 50.00 | 50.00 |
| Honcal 3 (800 mesh) (CC-700) | 325.00 | 325.00 | 325.00 | 325.00 |
| Kaolin clay (DB-80) | 115.00 | 115.00 | 115.00 | 115.00 |
| Grind Sub-total | 779.24 | 772.40 | 772.40 | 772.40 |
| Let-Down | | | | |
| Primal ™ AS-356 | 105.00 | 105.00 | 105.00 | 105.00 |
| Texanol | 4.02 | 4.02 | 4.02 | 4.02 |
| Nopco ™ NXZ | 0.50 | 0.50 | 0.50 | 0.50 |
| multi-stage polymer 1 | — | 0.50 | — | — |
| multi-stage polymer 2 | — | — | 1.00 | — |
| multi-stage polymer 3 | — | — | — | 1.00 |
| Water | 111.24 | 117.58 | 117.08 | 117.08 |
| Totals | 1000.00 | 1000.00 | 1000.00 | 1000.00 |

TABLE 5

| | Conventional example | Comparative example | Inventive example | Inventive example |
|---|---|---|---|---|
| | | Formulation Series | | |
| Material Name | A | E | F | G |
| Grind | | | | |
| Water | 250.00 | 250.00 | 250.00 | 250.00 |
| Natrosol ™ 250HBR | 5.32 | — | — | — |
| Orotan ™ 1288 | 8.17 | — | — | — |
| multi-stage polymer 1 | — | 6.80 | — | — |
| multi-stage polymer 2 | — | — | 7.00 | — |
| multi-stage polymer 3 | — | — | — | 7.00 |
| Orotan ™ 731A | — | 3.00 | 3.00 | 3.00 |
| AMP-95 | 1.05 | 1.70 | 1.70 | 1.70 |
| Propylene glycol | 20.00 | 20.00 | 20.00 | 20.00 |
| Kathon ™ LXE | 1.05 | 1.05 | 1.05 | 1.05 |
| Triton ™ CF-10 | 2.60 | 2.60 | 2.60 | 2.60 |
| Nopco ™ NXZ | 1.05 | 1.05 | 1.05 | 1.05 |
| Ti-Pure R-902 | 50.00 | 50.00 | 50.00 | 50.00 |
| Honcal 3 (800 mesh) (CC-700) | 325.00 | 325.00 | 325.00 | 325.00 |
| Kaolin clay (DB-80) | 115.00 | 115.00 | 115.00 | 115.00 |
| Grind Sub-total | 779.24 | 776.20 | 776.40 | 776.40 |
| Let-Down | | | | |
| Primal ™ AS-356 | 105.00 | 105.00 | 105.00 | 105.00 |
| Texanol | 4.02 | 4.02 | 4.02 | 4.02 |

TABLE 5-continued

|  | Conventional example | Comparative example | Inventive example | Inventive example |
|---|---|---|---|---|
|  | Formulation Series | | | |
| Material Name | A | E | F | G |
| Nopco ™ NXZ | 0.50 | 0.50 | 0.50 | 0.50 |
| Water | 111.24 | 114.28 | 114.08 | 114.08 |
| Totals | 1000.00 | 1000.00 | 1000.00 | 1000.00 |

V. Paint Results

First, full replacement of HEC and dispersant by Grinding Additive in high PVC interior paint formulation as shown in Table 4 was studied, because the full replacement of HEC and dispersant exhibited the most instability and the deepest gap to make up. Formulation series A is a conventional example. Formulation series B comprises multi-stage polymer 1, which does not comprise phosphorus containing monomer as polymerization unit. Formulation series C and D comprise multi-stage polymer 2 and 3 respectively, those comprise phosphorus containing monomer as polymerization unit. In each paint-making process, Grinding Additive was added mostly in the grinding stage as the dual functional additive of dispersant and thickener. In further let-down stage, a small amount of Grinding Additive was added as a thickener to adjust the viscosity of paint to around 100 KU. The basic application information was summarized in Table 6. The paints were stored continuously for three months in 50° C. oven. The overnight, 10 days, and 90 days viscosity change data were also summarized in Table 6.

TABLE 6

|  | Conventional example | Comparative example | Inventive example | Inventive example |
|---|---|---|---|---|
|  | Formulation Series | | | |
|  | A | B | C | D |
| Grinding Additive | — | multi-stage polymer 1 | multi-stage polymer 2 | multi-stage polymer 3 |
| Dosage of Grinding Additive in grind/let-down stage, g | — | 6.00/0.50 | 6.00/1.00 | 6.00/1.00 |
| Initial pH | 9.80 | 8.66 | 8.77 | 8.66 |
| 24 hr. pH | 9.60 | 8.84 | 8.77 | 8.65 |
| Initial KU | 94.7 | 94.7 | 97.4 | 95.0 |
| 24 hr. KU | 95.7 | 97.8 | 100.2 | 97.0 |
| Initial ICI | 0.910 | 0.438 | 0.440 | 0.445 |
| 24 hr. ICI | 0.905 | 0.410 | 0.455 | 0.480 |
| Initial Brookfield 4/6 | 10798 | 5699 | 5599 | 5799 |
| 24 hr. Brookfield 4/6 | 10898 | 6099 | 5699 | 5099 |
| Initial Brookfield 4/60 | 3269 | 2939 | 3109 | 2969 |
| 24 hr. Brookfield 4/60 | 3399 | 3449 | 3369 | 3039 |
| TI | 3.21 | 1.77 | 1.69 | 1.68 |
| 24 hr. Delta KU | 1.0 | 3.1 | 2.8 | 2.0 |
| 10 days HA Delta KU | −1.2 | 2.5 | 2.5 | 0.5 |
| 90 days HA Delta KU | −4.3 | 12.2 | 8.1 | 2.1 |

Referring to Table 6, multi-stage polymer 2 and 3 (Inventive examples C and D) prevent KU viscosity increasing after heat-age storage for 90 days, comparing with multi-stage polymer 1 (comparative example B). Especially, multi-stage polymer 3 significantly improves KU viscosity for 10 days and 90 days comparable with the performance of original HEC/polyacid dispersant formulation (Conventional example A). The data after heat-age storage indicates that organic phosphate-containing Grinding Additive showed significant improvement on formulation stability.

Next, partial dispersant replacement formulation as shown in Table 5 was tested. In these series of formulations, 3.0 g of Orotan™ 731A was added to balance the formulation stability and performance. The basic application information was summarized in Table 7. The paints were stored continuously for 70 days in 50° C. oven. The overnight, 10 days, and 70 days viscosity change data were also summarized in Table 7.

TABLE 7

|  | Conventional example | Comparative example | Inventive example | Inventive example |
|---|---|---|---|---|
|  | Formulation Series | | | |
|  | A | E | F | G |
| Grinding Additive | — | multi-stage polymer 1 | multi-stage polymer 2 | multi-stage polymer 3 |

TABLE 7-continued

| | Conventional example | Comparative example | Inventive example | Inventive example |
|---|---|---|---|---|
| Formulation Series | A | E | F | G |
| Dosage of Grinding Additive in grind/let-down stage, g | — | 6.80/0 | 7.00/0 | 7.00/0 |
| Initial pH | 9.80 | 8.91 | 8.93 | 8.90 |
| 24 hr. pH | 9.60 | 9.02 | 8.84 | 9.01 |
| Initial KU | 94.7 | 102.0 | 100.5 | 97.7 |
| 24 hr. KU | 95.7 | 103.2 | 99.2 | 95.2 |
| Initial ICI | 0.910 | 0.515 | 0.465 | 0.425 |
| 24 hr. ICI | 0.905 | 0.445 | 0.480 | 0.425 |
| Initial Brookfield 4/6 | 10798 | 6999 | 5499 | 4899 |
| 24 hr. Brookfield 4/6 | 10898 | 6799 | 4799 | 3999 |
| Initial Brookfield 4/60 | 3269 | 3889 | 3299 | 3099 |
| 24 hr. Brookfield 4/60 | 3399 | 3969 | 2949 | 2609 |
| TI | 3.21 | 1.71 | 1.63 | 1.53 |
| 24 hr. Delta KU | 1.0 | 1.2 | -1.3 | -2.5 |
| 10 days HA Delta KU | -1.2 | 4.4 | 3.2 | 4.8 |
| 70 days HA Delta KU | -4.1 | 13.8 | 10.8 | 6.3 |

Referring to Table 7, the paint viscosity data after heat-age storage showed the improved paint stability by using organic phosphate-containing Grinding Additive multi-stage polymer 2 (inventive example F) and multi-stage polymer 3 (inventive example G) comparing with multi-stage polymer 1 (comparative example E).

Freeze/thaw stability were also tested to evaluate the formulation stability from a different perspective. Each of formulation was tested at -7° C. for five cycles. After each "freeze/thaw" cycle completed, the paint was placed standing (no stirring) at constant temperature to recover to 25° C. The appearances of paints after each "freeze/thaw" cycle were monitored and compared.

Table 8 summarized the evaluation results of full HEC and dispersant replacement formulation (in Table 4). It is obviously observed that the paint with multi-stage polymer 1 (comparative example B) exhibited synerisis since completion of the $2^{nd}$ cycle of test, and the appearance got even worse along with further cycles of test. In contrast, paints with multi-stage polymer 2 (inventive example C) and multi-stage polymer 3 (inventive example D) showed good appearance after all of 5 cycles of test, except for slight synerisis of multi-stage polymer 2 only after the $5^{th}$ cycle test.

After completion of all the 5 cycles of test, the paints were thoroughly stirred, and the overall appearances were compared. The paint with multi-stage polymer 1 (comparative example B) was observed with flocculation and could not recover by stirring. In comparison, both of the two Inventive examples C and D showed good appearance and flowability with no flocculation or sedimentation, which were quite comparable with the performance of the original formulation A with HEC/polyacid dispersant. These results were confirmed by drawing down of paints C and D on vinyl chart with a 100 µm applicator, and both of the paint films were observed with no flocculation.

The same freeze/thaw stability test was conducted for partial dispersant replacement formulation series E, F, and G. All of the paints passed 5 cycles of freeze/thaw tests.

The invention claimed is:

1. A multi-stage polymer comprising a first stage polymer and a second stage polymer, wherein the first stage polymer comprises, as polymerization units, based on the total weight of the first stage polymer:
   (a) from 30 wt % to 70 wt % of an α,β-ethylenically unsaturated carboxylic acid monomer;
   (b) from 0.1 wt % to 50 wt % of a macromonomer characterized by the following formula:

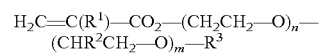
   $H_2C=C(R^1)-CO_2-(CH_2CH_2-O)_n-(CHR^2CH_2-O)_m-R^3$ wherein $R^1$ is hydrogen atom or methyl group; $R^2$ is $C_1$-$C_2$ alkyl; $R^3$ is $C_8$-$C_{30}$ alkyl, $C_8$-$C_{16}$ alkylphenyl or $C_{13}$-$C_{36}$ aralkylphenyl; n and m are independently an integer from 6 to 100 and 0 to 50, respectively, provided that n≥m and the sum of m and n is from 6 to 100, and

TABLE 8

| Example type | Formulation series | Grinding Additive | Freeze/thaw stability test result | | | | | |
|---|---|---|---|---|---|---|---|---|
| | | | $1^{st}$ | $2^{nd}$ | $3^{rd}$ | $4^{th}$ | $5^{th}$ | Overall |
| Conventional example | A | — | Good | Good | Good | Good | Good | Pass |
| Comparative example | B | Multi-stage polymer 1 | Good | Synerisis 1 mm | Synerisis 2 mm | Synerisis 3 mm | Synerisis 5 mm | Fail, due to paint flocculation |
| Inventive example | C | Multi-stage polymer 2 | Good | Good | Good | Good | Synerisis 1 mm | Pass |
| Inventive example | D | Multi-stage polymer 3 | Good | Good | Good | Good | Good | Pass |

(c) from 30 wt % to 70 wt % of an α,β-ethylenically unsaturated monomer other than the α,β-ethylenically unsaturated carboxylic acid monomer (a) and the macromonomer (b); and the second stage polymer comprises, as polymerization units, based on the total weight of the second stage polymer;
(d) from 25 to 80 wt % of an α,β-ethylenically unsaturated carboxylic acid monomer;
(e) from 0.1 to 50 wt % of a phosphorus containing monomer comprising phosphorus acid group or phosphate group, and
(f) from 20 wt % to 75 wt % of an α,β-ethylenically unsaturated monomer other than the α,β-ethylenically unsaturated carboxylic acid monomer (d) and the phosphorus containing monomer (e), and both first stage polymer and second stage polymer are base-soluble polymers.

2. The multi-stage polymer of claim 1, wherein the first stage polymer contains an absence of the phosphorus containing monomer.

3. The multi-stage polymer of claim 1, wherein the first stage polymer has a weight average molecular weight of at least 50,000 Daltons, and the second stage polymer has a weight average molecular weight of from 500 to 20,000 Daltons.

4. The multi-stage polymer of claim 1, wherein the phosphorus containing monomer is mono- or di-ester of phosphoalkyl (meth)acrylate.

5. A method for preparing a multi-stage polymer comprising the steps of:
i) polymerizing a first stage polymer from a first monomer composition comprising:
(a) from 30 wt % to 70 wt % of an α,β-ethylenically unsaturated carboxylic acid monomer;
(b) from 0.1 wt % to 50 wt % of a macromonomer characterized by the following formula:

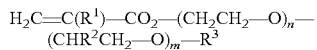

wherein $R^1$ is hydrogen atom or methyl group; $R^2$ is $C_1$-$C_2$ alkyl; $R^3$ is $C_8$-$C_{30}$ alkyl, $C_8$-$C_{16}$ alkylphenyl or $C_{13}$-$C_{36}$ aralkylphenyl; n and m are independently an integer from 6 to 100 and 0 to 50, respectively, provided that n≥m and the sum of m and n is from 6 to 100, and
(c) from 30 wt % to 70 wt % of an α,β-ethylenically unsaturated monomer other than the α,β-ethylenically unsaturated carboxylic acid monomer (a) and the macromonomer (b), to obtain a first stage polymer;
ii) contacting the first stage polymer with a second monomer composition comprising, based on the weight of the second monomer composition:
(d) from 25 to 80 wt % of an α,β-ethylenically unsaturated carboxylic acid monomer;
(e) from 0.1 to 50 wt % of a phosphorus containing monomer comprising phosphorus acid group or phosphate group, and
(f) from 20 wt % to 75 wt % of an α,β-ethylenically unsaturated monomer other than the α,β-ethylenically unsaturated carboxylic acid monomer (d) and the phosphorus containing monomer (e), and
iii) polymerizing the second monomer composition to obtain a second stage polymer under the presence of the first stage polymer.

6. A polymer composition formed from a method comprising at least two polymerization steps, wherein the method comprises the steps of:
i) polymerizing a first stage polymer from a first monomer composition under emulsion polymerization conditions, in which the first stage monomer composition comprises
(a) from 30 wt % to 70 wt % of an α,β-ethylenically unsaturated carboxylic acid monomer;
(b) from 0.1 wt % to 50 wt % of a macromonomer characterized by the following formula:

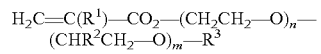

wherein $R^1$ is hydrogen atom or methyl group; $R^2$ is $C_1$-$C_2$ alkyl; $R^3$ is $C_8$-$C_{30}$ alkyl, $C_8$-$C_{16}$ alkylphenyl or $C_{13}$-$C_{36}$ aralkylphenyl; n and m are independently an integer from 6 to 100 and 0 to 50, respectively, provided that n≥m and the sum of m and n is from 6 to 100, and
(c) from 30 wt % to 70 wt % of an α,β-ethylenically unsaturated monomer other than the α,β-ethylenically unsaturated carboxylic acid monomer (a) and the macromonomer (b); to obtain a first stage polymer;
ii) contacting the first stage polymer with a second monomer composition comprising, based on the weight of the second monomer composition:
(d) from 25 to 80 wt % of an α,β-ethylenically unsaturated carboxylic acid monomer;
(e) from 0.1 to 50 wt % of a phosphorus containing monomer comprising phosphorus acid group or phosphate group, and
(f) from 20 wt % to 75 wt % of an α,β-ethylenically unsaturated monomer other than the α,β-ethylenically unsaturated carboxylic acid monomer (d) and the phosphorus containing monomer (e),
wherein the ratio of the first stage polymer to the second monomer composition is from 90:10 to 50:50, and
iii) polymerizing the second monomer composition under emulsion polymerization conditions, to obtain a second stage polymer in the presence of the first stage polymer.

7. A composition comprising the multi-stage polymer of claim 1 as an emulsion state.

8. A paint composition comprising the multi-stage polymer of claim 1, a binder, a pigment and an extender.

9. A method of thickening a paint composition by incorporating the multi-stage polymer of claim 1 and neutralizing the multi-stage polymer.

10. A method of dispersing a pigment and an extender in a paint composition by incorporating the multi-stage polymer of claim 1 and neutralizing the multi-stage polymer.

* * * * *